US008162667B1

(12) United States Patent
Poulsen

(10) Patent No.: US 8,162,667 B1
(45) Date of Patent: *Apr. 24, 2012

(54) SUBLIMINAL OR NEAR-SUBLIMINAL CONDITIONING USING DIFFUSE VISUAL STIMULI

(76) Inventor: Peter D. Poulsen, Grants Pass, OR (US)

( * ) Notice: Subject to any disclaimer, the term of this patent is extended or adjusted under 35 U.S.C. 154(b) by 41 days.

This patent is subject to a terminal disclaimer.

(21) Appl. No.: 12/626,923

(22) Filed: Nov. 29, 2009

Related U.S. Application Data

(63) Continuation of application No. 11/030,458, filed on Jan. 5, 2005, now Pat. No. 7,648,366.

(60) Provisional application No. 60/534,231, filed on Jan. 5, 2004.

(51) Int. Cl.
G09B 19/00 (2006.01)

(52) U.S. Cl. ........................................................ 434/236

(58) Field of Classification Search .................. 434/156, 434/157, 178, 236, 307 R, 308, 309, 314; 348/563, 564
See application file for complete search history.

(56) References Cited

U.S. PATENT DOCUMENTS

| 3,060,795 | A | | 10/1962 | Corrigan et al. | |
|---|---|---|---|---|---|
| 3,278,676 | A | | 10/1966 | Becker | |
| 4,636,173 | A | * | 1/1987 | Mossman | 434/178 |
| 4,692,118 | A | | 9/1987 | Mould | |
| 4,717,343 | A | | 1/1988 | Densky | |
| 4,734,037 | A | | 3/1988 | McClure | |
| 5,083,924 | A | | 1/1992 | Cochran et al. | |
| 5,221,962 | A | | 6/1993 | Backus et al. | |
| 5,304,112 | A | | 4/1994 | Mrklas et al. | |
| 5,388,994 | A | | 2/1995 | Wexelman | |
| 5,451,163 | A | * | 9/1995 | Black | 434/178 |
| 5,722,418 | A | | 3/1998 | Bro | |
| 6,057,846 | A | * | 5/2000 | Sever, Jr. | 345/419 |
| 6,652,283 | B1 | * | 11/2003 | Van Schaack et al. | 434/236 |
| 6,656,137 | B1 | | 12/2003 | Tyldsley et al. | |
| 6,669,479 | B1 | * | 12/2003 | Jenkins | 434/178 |
| 6,967,594 | B2 | | 11/2005 | Gerrity | |
| 7,011,526 | B2 | | 3/2006 | Boon | |
| 2003/0036042 | A1 | | 2/2003 | Hill | |
| 2003/0157468 | A1 | | 8/2003 | Kasahara | |
| 2004/0161730 | A1 | | 8/2004 | Urman | |

OTHER PUBLICATIONS

Watanabe et al; "Greater plasticity in power-level than higher-level visual motion processing in a passive perceptual learning task"; Nature Neuroscience vol. 5 p. 1002 (2002).
Seitz and Watanabe; "Is subliminal learning really passive?"; Nature vol. 422 p. 36 (2003).

(Continued)

Primary Examiner — Kurt Fernstrom
(74) Attorney, Agent, or Firm — David S. Alavi

(57) ABSTRACT

A method comprises: i) presenting to a subject a training stimulus, the training stimulus eliciting from the subject a desired response; ii) presenting to the subject a diffuse visual stimulus along with the training stimulus; and iii) repeating the presenting to the subject of the training stimulus along with the diffuse visual stimulus sufficiently many times so that subsequent presentation of the diffuse visual stimulus to the subject without the training stimulus elicits from the subject the desired response. The diffuse visual stimulus is arranged so as to be perceived by the subject only at a subliminal or near-subliminal level. Another method comprises presenting to the subject the diffuse visual stimulus in order to elicit the desired response, the subject having been conditioned according to the previous method.

16 Claims, 5 Drawing Sheets

OTHER PUBLICATIONS

Kim et al.; "Effect of reward on perceptual learning"; Vision Society Meeting proceedings May 11, 2007; Journal of Vision vol. 7 No. 9 p. 85a (2007).

Nishina et al.; "Subliminal visual feature is learned better when spatially closer to attended task"; Vision Society Meeting proceedings May 11, 2007; Journal of Vision vol. 7 No. 9 p. 44a (2007).

Tsushima et al; "Greater disruption due to failure of inhibitory control on an ambiguous distractor"; Science vol. 314 p. 1786 (2006).

Watanabe: "What gates visual plasticity?"; talk given Jan. 19, 2007 at Center for Mind and Brain, UC Davis.

Watanabe et al; "Perceptual learning without perception"; Nature vol. 413 p. 844 (2001).

Seitz et al; "Task-specific disruption of perceptual learning"; Proceedings of the National Academy of Sciences vol. 102 p. 14895 (2005).

Seitz et al; "Visual experience can substantially alter critical flicker fusion thresholds"; Human Psychopharmacology vol. 20 p. 55 (2005).

* cited by examiner

SUBLIMINAL OR NEAR-SUBLIMINAL CONDITIONING USING DIFFUSE VISUAL STIMULI

BENEFIT CLAIMS TO RELATED APPLICATIONS

This application is a continuation of U.S. non-provisional application Ser. No. 11/030,458 filed Jan. 5, 2005 now U.S. Pat. No. 7,648,366 in the name of Peter D. Poulsen, which in turn claims benefit of prior-filed provisional App. No. 60/534,231 filed Jan. 5, 2004 in the name of Peter Davis Poulsen, both of said applications being hereby incorporated by reference as if fully set forth herein.

BACKGROUND

The field of the present invention relates to behavioral conditioning. In particular, methods for subliminal and near-subliminal conditioning, and for eliciting responses so conditioned, are disclosed herein.

The human nervous system processes external source data at very high rates, perhaps as much as several billions of bits per second (several Gbit/sec). A majority of such processing occurs at a subconscious level, but may nevertheless guide the body in its maintenance and control functions. The associated neurological data processing "subsystems" typically call for the attention of the human conscious "executive system" only as needed, such as when something is awry or when the conscious executive has requested a special report. One may appreciate the advantage of such sub-conscious processing in light of the observation that the highest rates of conscious information processing have been estimated to be less than 100 bits per second, even as low as 25 bits per second.

The visual subsystem operates like other human processor subsystems in that i) it employs subconscious processing, and ii) much of what is done in response to the images processed by the visual subsystem is not "conscious" activity (e.g., avoiding walking into walls, moving out of the way of approaching objects, and so forth). The evident capacity of the visual subsystem to accommodate high-speed processes and translate them into performance instructions without burdening the executive consciousness is remarkable, and is exploited in the exemplary embodiments disclosed or claimed herein.

It has been estimated that the human visual subsystem processes information at rates that may reach many hundreds of millions of bits per second (i.e., 100 s of Mbit/sec). A majority of this visual processing must necessarily occur at retinal or subconscious levels. It has been estimated that on the order of 100:1 processing compression and certain forms of motion detection occur even before the visual data is passed through the optic nerves. Of this compressed data, only a small subset of the original retinal-image information is used to achieve significant conscious or unconscious results. Focus control, gain control, pupil control, and other visual task functions proceed reliably and smoothly without "executive" conscious intervention.

Visual observables are prioritized and dealt with in a hierarchal fashion. For example, when eyeglasses have a speck of dust or a smudge on them, the effects they produce on such detailed eye functions as reading text are overlooked and bypassed. This does not necessarily mean that the visual subsystem has not taken note of them; it simply means that they have been relegated to a classification where they do not deter consciously mandated focused-image objectives.

One reason that dust and smudges, up to a point, do not impair functions such as reading and driving a car, is that the location of the plane of the eyeglasses is too close to the cornea for the dust and smudges to be focused onto the retina. They typically appear only as blurs and shadows. These blurs and shadows may be noted, but a reader or driver does not respond to them in the same manner as he responds to printed letters and road features that are focused onto the retina.

It has long been the practice of information and display technologists to assume that essentially all optically-based information presented to the eye should be focused to a sharp, well-defined image. This is the case, for example, with written and graphic presentations in virtually all visual display systems, such as movies, television, computer displays, printed displays, and the like. It has also been a tenet of prior practice to assume that eyeglass, eyewear, windows, or similar substantially transparent devices should be clear and unchanging. Such prior limitations are disregarded in the embodiments disclosed or claimed herein. The scope of the present disclosure encompasses use of diffuse visual stimuli (e.g. a purposely out-of-focus image, or an otherwise diffuse visual light pattern) impinging on the human (or animal) retina to impart information that may influence a human (or animal) subject in a subliminal, or near-subliminal, manner.

It is reasonable to posit that all subliminal processing is experience based. That may be why previous attempts at subliminal inducements, such as interspersing frames of cola images in movies, have failed. The frames are not "seen" due to integration, nor do they provide a relevant experience. In contrast to these failed historical endeavors, the embodiments disclosed or claimed herein provide a relevant associated experience with each subliminal training event.

SUMMARY

A method comprises: i) presenting to a subject a training stimulus, the training stimulus eliciting from the subject a desired response; ii) presenting to the subject a diffuse visual stimulus along with the training stimulus; and iii) repeating the presenting to the subject of the training stimulus along with the diffuse visual stimulus sufficiently many times so that subsequent presentation of the diffuse visual stimulus to the subject without the training stimulus elicits from the subject the desired response. The diffuse visual stimulus is arranged so as to be perceived by the subject only at a subliminal or near-subliminal level. Another method comprises presenting to the subject the diffuse visual stimulus in order to elicit the desired response, the subject having been conditioned according to the previous method.

Objects and advantages pertaining to methods and apparatus disclosed or claimed herein may become apparent upon referring to the exemplary embodiments illustrated in the drawings and disclosed in the following written description or claims.

The embodiments shown in the Figures are exemplary, and should not be construed as limiting the scope of the present disclosure and/or appended claims.

DETAILED DESCRIPTION OF EMBODIMENTS

Methods are disclosed or claimed herein for training a subject so that a diffuse visual stimulus (i.e., a subliminal or near-subliminal stimulus) elicits a desired response from the trained subject. Additional methods are disclosed herein for eliciting the conditioned response by presenting the diffuse visual stimulus to the subject after the subject has been trained. The diffuse visual stimulus typically comprises a non-imaged visual display or visual pattern. The disclosed embodiments are processes to train, and utilize the training, of a subject by presentation during training of a repeated subliminal or near-subliminal sensory stimulus (i.e., a diffuse, non-imaged visual stimulus) along with a training stimulus (e.g., an emotional experience, or a conscious instruction/response set, or other training stimulus). After sufficiently many repetitions of the training stimulus along with the diffuse, non-imaged visual stimulus, the trained subject will typically exhibit the desired response in response to the diffuse visual stimulus alone. The methods disclosed herein may be better understood nominally dividing stimuli (or cues) into two categories: i) discernable, or conscious; and ii) subliminal, near-subliminal, subconscious, near-subconscious, or diffuse, and by nominally dividing the methods into two categories: i) training or conditioning; and ii) utilization.

Figure 1:
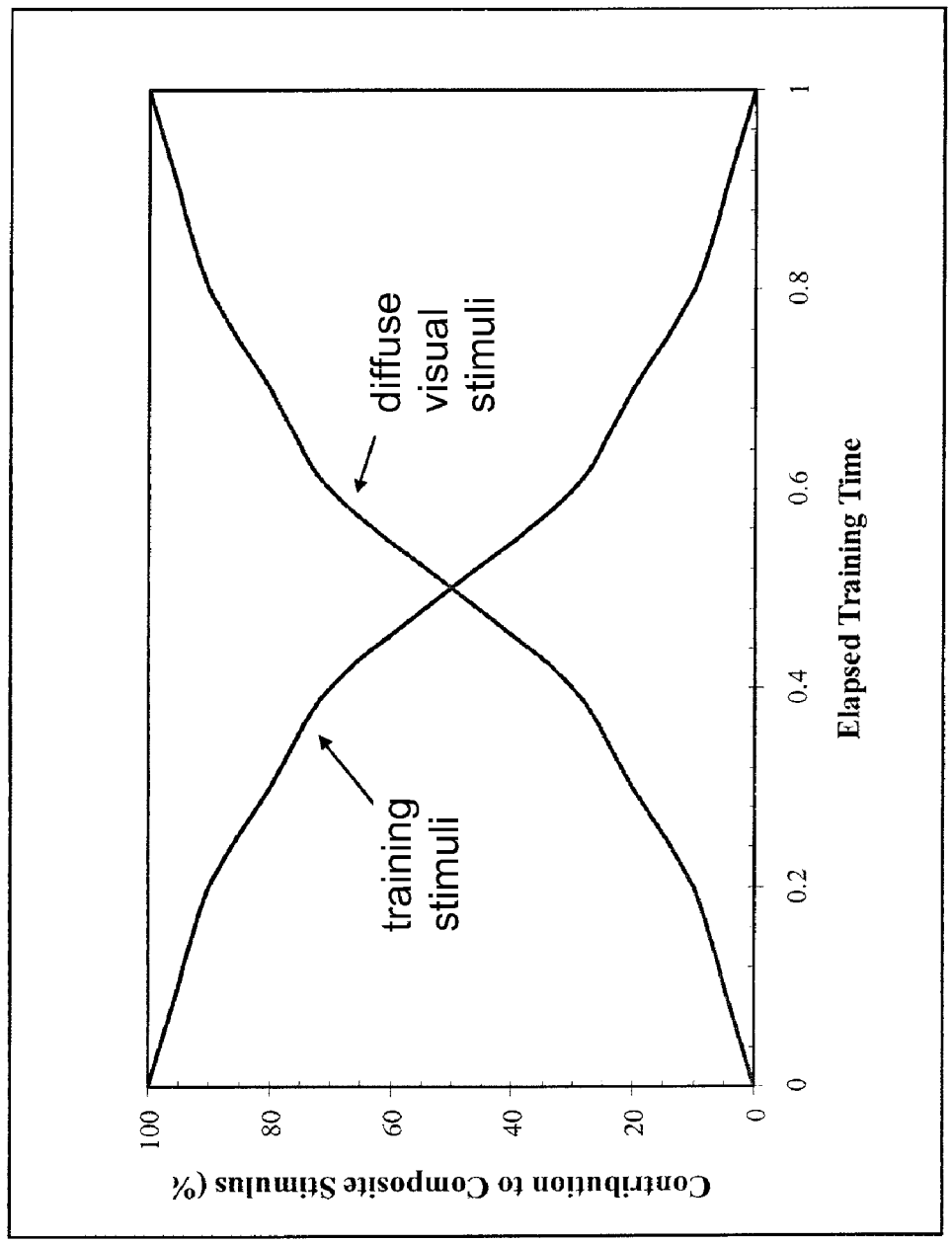
FIG. 1 illustrates schematically one exemplary scheme for varying the presentation of training stimuli and diffuse visual stimuli.

During a training or conditioning process, a subject is presented with an integrated, composite set of stimuli, one or more of which that are discernable to conscious awareness (the training stimulus), and one or more of which that are subliminal to conscious awareness (a diffuse visual stimulus). Although in some exemplary training processes or methods a subject may recognize that he or she is being trained to give a specific desired response to a specific discernable cueing stimulus (the training stimulus), the subject may not realize that he or she is also being trained to exhibit the same response due to a subliminal component of the composite cue (i.e., due to the diffuse visual stimulus). The discernable cues or training stimuli may be reduced in strength during training so that the subject becomes relatively more strongly influenced by the subliminal or near-subliminal component of the composite stimuli (illustrated schematically in FIG. 1). In some embodiments, an objective of the training or conditioning may be to render more significant the influence of the subliminal stimulus than the influence of the training stimulus, so that the trained or conditioned subject operates as if the discernable component or training stimulus were still present.

It is not always necessary that the subject take strong note of the presence of a discernable stimulus (i.e., the training stimulus) as an element of the training process. It may be the case that other consciously observable stimuli capture a subject's attention with a higher priority than the training stimulus at a given moment. In other cases, however, it may be necessary for the subject to be aware of the discernable stimulus at a high-priority conscious level. This would be the case, for example, if as the discernable component (training stimulus) of the composite stimulus a subject were being audibly instructed via spoken language, or visually instructed via text or graphics, to perform a certain action. For example, the training stimulus might comprise the instruction "Flip the red switch", while the corresponding desired response would be the subject flipping the red switch. Such a training stimulus would fall within the conscious awareness of the subject. In this example, the intended outcome of the training would be the subject flipping the red switch in response to the diffuse visual stimulus, without the accompanying "Flip the red switch" instruction.

In other embodiments, it may be neither necessary, nor desirable, for the subject to be intellectually aware of, or focused on, either the discernable stimulus cue or the discernable response during the training process. An example of such an embodiment might comprise the use of commercial entertainment movies for training. When a subject is presented with a movie that contains scenes that evoke strong emotional response (fear, anger, joy, etc.), a subject may typically discern that he or she is undergoing such a response, and the subject may typically discern that he or she is undergoing the emotional response in a direct relationship to the discernable stimulus (i.e., the movie scene, or the evocation of memory or anticipation of the content in another scene). However, the conscious mind of the subject might typically be too preoccupied with the flow of the movie to devote efforts toward organizing an immediate analytical interpretation of cause and effect for the emotional response. This reduced conscious attention in no manner diminishes the reality of either the stimulus or the response, or the subject's ability to discern them. The training of emotionally conditioned response to subliminal or near-subliminal stimulus facilitates the later utilization of the Invention for the evocation of an emotional response even under circumstances that such an emotion might not be generally considered appropriate.

Any desired response on the part of the subject may fall within the scope of the present disclosure, and may include, but are not limited to: mechanical actions, i.e., a volitional or non-volitional movement on the part of the subject; physiological manifestations; or psychological or emotional responses. These will be briefly discussed at this juncture for the purpose of differentiation and clarification. It should be noted that such conditioned responses are different from intuitive responses, and are also different from instinctual responses.

Examples of mechanical actions would include, but are not limited to, volitional or non-volitional movement of body parts (arms, hands, fingers, legs, feet, toes, torso, neck, head, etc.). Such movement might be used to throw a switch, hit a brake, strike an object, say a word or phrase, or any other desired movement. Mechanical actions are bodily responses, including speech, often imposed on objects or elements external to the subject. An observer might classify such responses as a subject's overt behavior.

Examples of physiological manifestations might include, but are not necessarily limited to, altered pulse rate, altered respiration rate, altered blood pressure, nausea, sweating, urinary urgency, irritable bowels, shivering or trembling, sexual arousal, or other bodily responses that do not necessarily impose themselves mechanically on elements external to a subject. Physiological manifestations (which might include chemical, muscle, tissue, and other bodily elements) may be predominantly internal to a subject.

Examples of psychological or emotional responses might include, but are not necessarily limited to, anxiety, anger, joy, fear, contentment, mirth, and the like. These may or may not be expressed in immediate terms as associated mechanical or physiological responses.

Emotional Response to a Video Display

In an exemplary embodiment, movies or video programming may be employed as the training medium, wherein a specific subliminal or near-subliminal cue is presented each time a corresponding specific emotion is engendered by a scene of a movie. Viewing of movies by the public affords the opportunity for hundreds or even thousands of hours of training time for individual members of the public. Video displays for entertainment and for commerce are widely used and are of substantially similar format, and afford numerous opportunities for eliciting desired trained responses.

Figure 2:
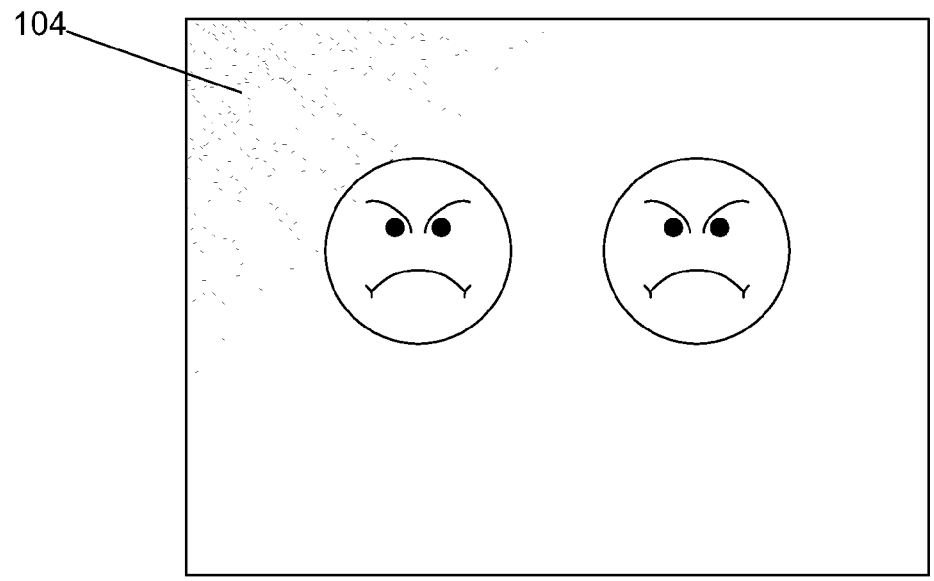
FIG. 2 illustrates schematically an exemplary diffuse visual pattern overlaid on an image eliciting a negative emotional response.
Figure 3:
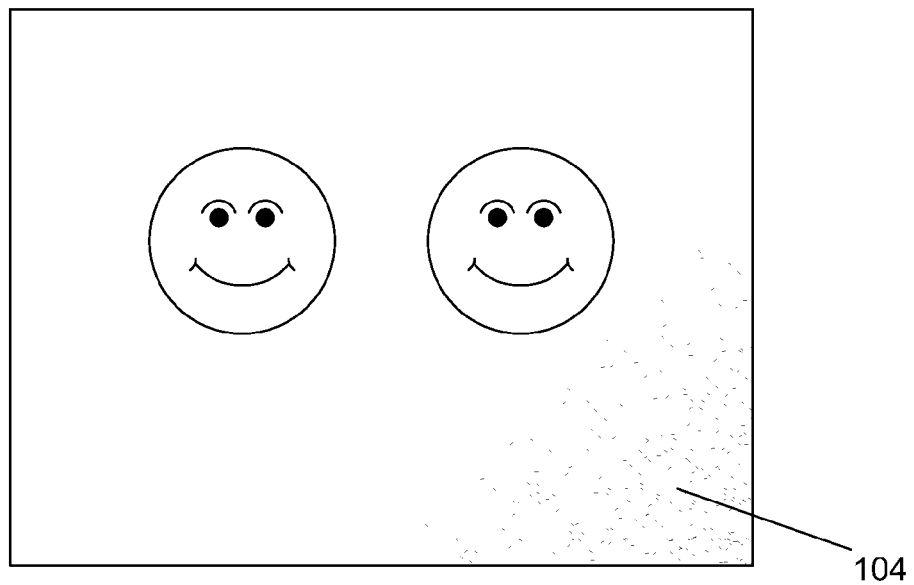
FIG. 3 illustrates schematically an exemplary diffuse visual pattern overlaid on an image eliciting a positive emotional response.

For example, movies might be "spiked" with subliminal or near-subliminal diffuse, non-imaged visual changes that coincide with emotional events in the movie. A slight cyclic change of brightness 104 in the upper left corner of the picture 102 (as in FIG. 2) might be imposed in a highly diffuse form, feathered into the main picture toward the center so that no notable edge is present (schematically illustrated in FIGS. 2 and 3). This slight change can be kept to a subliminal or near subliminal level and introduced every time a negative emotion is induced by the visual and audio content of the movie (as in FIG. 2). A similar subliminal or near-subliminal diffuse, non-imaged visual effect may be prepared for the opposite corner of the picture, the lower right. However, this effect would only be presented when a positive emotion was induced by the content of the movie (as in FIG. 3). Since an average viewer watches thousands of hours of DVD movies, taped movies, and television broadcast movies every year, widespread implementation of these two diffuse, non-imaged visual effects would eventually train viewers to feel positive when the one diffuse visual effect was present and to feel negative when the other diffuse visual effect was present. Once conditioned, the diffuse, non-imaged visual effects could be used to influence subjects' emotional reactions when viewing other displayed video material. The conditioned emotional responses could be employed to influence viewing, purchasing, or voting decisions, for example. Even a small degree of effectiveness of such training may result in a major sales or political advantage, since the success of a business or a politician often rests on a small margin of difference between the successful choice and the unsuccessful choice.

It should be noted that, to some degree, the music within the movie is used to assist the attainment of a desired psychological or emotional response of a viewer. There are common musical elements used to prelude or to enhance the emotional response associated with a scene or image. However, these preludes and enhancements are all discernable. While they are in the "background," they are easily noted on a conscious level by the subject's hearing. Such would not fall within the scope of subliminal or near-subliminal stimuli as disclosed or claimed herein.

Figure 4:
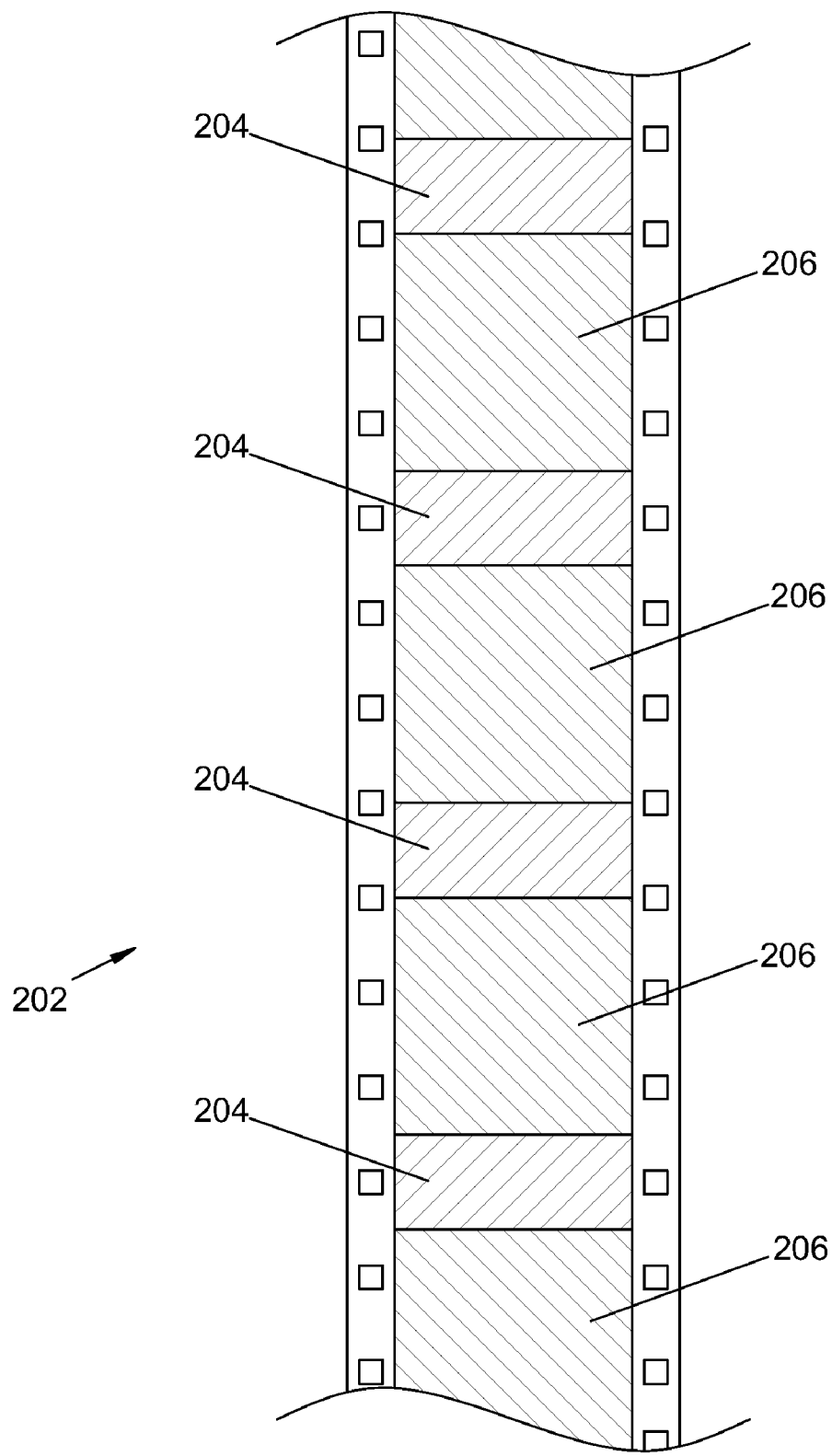
FIG. 4 illustrates schematically one exemplary sequence for inserting training images into a movie or program sequence.

FIG. 4 schematically illustrates a training scene sequence, wherein various training scene sequences may be implemented. In a first example, training scenes or images 204 (i.e., training stimuli), not necessarily related to the movie or program, are inserted into the program or movie sequence 202 between normal scenes or images 206. The inserted scenes or images are chosen to evoke the desired emotional response to be conditioned (i.e., the desired response), and the corresponding diffuse, non-imaged visual effect (the diffuse, non-imaged visual stimulus) is superimposed onto the appropriate portion of the training scene or image. Repeated occurrences of the training scenes along with the diffuse, non-imaged visual effect eventually trains the subject to exhibit the desired emotion in response to the diffuse visual effect alone, without the accompanying training scene or image. In a second example, the training scenes might be normal scenes of the movie or program, with overlaid discernable training images (chosen to evoke the desired emotional response) and overlaid diffuse, non-imaged visual effects (to eventually correspond to the desired emotional response). In a third example, the training scenes might be actual scenes of the movie or program, and the appropriate diffuse, non-imaged visual effect overlaid when the inherent emotional content of the movie or program scene matches the desired emotional response. Whichever of these schemes is used, or if other schemes are devices and used, repeated occurrences of the training scenes along with the corresponding diffuse, non-imaged visual effect eventually trains the subject to exhibit the desired emotion in response to the diffuse, non-imaged visual effect alone, without the accompanying training scene or image. The diffuse, non-imaged visual effects may then be superimposed on other images in order to evoke the desired response from suitable conditioned subjects. Many uses (and potential abuses) of such conditioning in advertising, marketing, politics, and other areas may be devised.

Aid for the Hearing Impaired

Among the significant communication problems that burden persons with severe hearing impairment are: inaccurate lip-reading; unclear speech (typically due to lack of auditory feedback, particular for congenital or early-onset deafness); unawareness of a speaker out of view; and unawareness of audio cues, signals, alarms, and so forth. These problems maybe addressed through implementation of methods disclosed or claimed herein, for example by using a liquid crystal technology, near-field optics, and the abundant capacity of the human visual subsystem to convey sound into the subconscious mind for routine subliminal or near-subliminal processing.

Like the visual subsystem, the human auditory subsystem is also predominantly subconscious in its processing and in its evocation of body responses. Time-varying sound pressure is converted into amplitude/frequency/time information through the sophisticated yet relatively straightforward mechanical principles of cochlear transduction. The conversion and processing rate of the sound pressure signal, which has been estimated to have usable content input to the ear of about 40-thousand bits per second, is compressed and sent to the brain for further processing at the order of 10-thousand bits per second (estimated). When mechanical components, or cochlear function, or a portion of the ear-to-brain nerve network, or a combination of these, are impaired, then a person exhibits hearing deficiency. Such deficiency may produce complete deafness. The excess capacity of the visual subsystem may be called upon to take on additional burdens to assist a hearing-deficient person in the everyday conduct of life.

Figure 5:
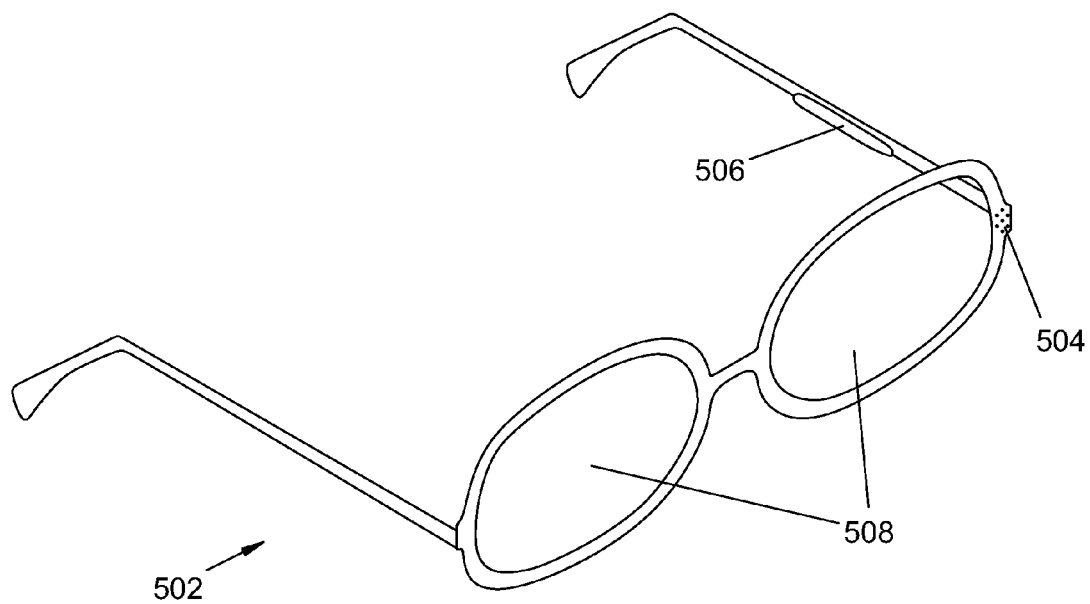
FIG. 5 illustrates schematically exemplary eyewear.
Figure 6:
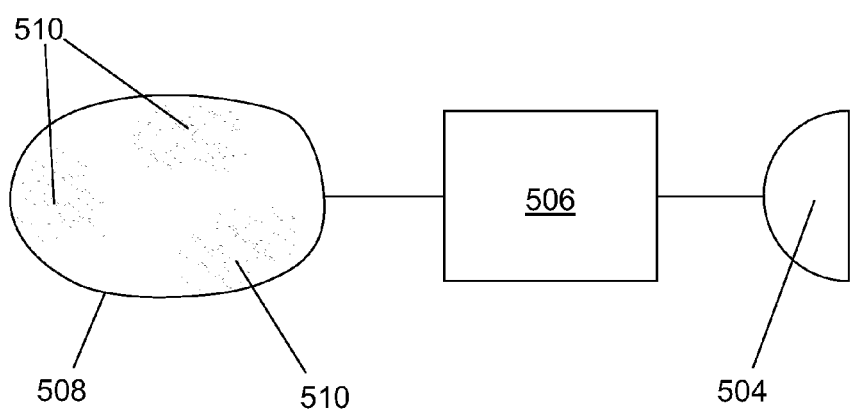
FIG. 6 illustrates schematically a microphone, processor, and eyewear.

In this exemplary embodiment (schematically illustrated in FIGS. 5 and 6), the actual auditory input may be received by a microphone 504 or other transducer and converted to a diffuse, non-imaged visual pattern 510 by an electronic processor 506 according to a predetermined algorithm. The diffuse, non-imaged visual pattern may be presented to the visual subsystem of the hearing-deficient subject in a non-obtrusive way. Through repeated use and practice (i.e., conditioning or training), the hearing-impaired subject's visual subsystem learns to interpret the diffuse, non-imaged visual patterns, and these interpretations may enhance the accuracy of lip-reading, may enable the subject to become aware of and even correctly interpret sounds emanating from outside his or her field of view. Such feedback may also provide feedback to the subject so as to improve his or her own speech, since his/her own speech sounds may be monitored and compared with those of other people with whom he/she converses.

In an exemplary embodiment, liquid crystal strips and microelectronics might be used to create "dynamic smudges" on lenses 508 of eyewear 502 adapted therefor to introduce diffuse, non-imaged visual patterns 510 into the subject's visual processing subsystem. Any other suitable means may be employed as well. These diffuse, non-imaged visual inputs may assist a hearing-deficient subject to improve his/her lip-reading accuracy, or to improve his/her speech clarity. The eyeglasses 502 need not be bulky or unattractive, since the embedded liquid crystal strips are themselves transparent when not activated and in general may be effective when only activated to levels of ten percent or less of the glasses transparency. Other levels of transparency modulation may be employed within the scope of the present disclosure or appended claims. The microphone 504 or other transducer and the electronic processor 506 may be made sufficiently small to be embedded into the ear-stem of the glasses, although other sizes or locations of the microphone or other transducer and the electronic processor shall also fall within the scope of the present disclosure or appended claims. Alternatively, this exemplary embodiment may employ discrete emitters, rather than liquid crystal transmission smudges, with the location of the emitters being at a position too close to the eye to be focused on the retina and thereby yielding a diffuse, non-imaged visual pattern. The diffuse, non-imaged nature of the visual patterns are such that they are subliminal or near-subliminal, and therefore do not distract from conscious visual attention.

As an example, the device might introduce visual smudge changes at about 3200 bits per second, an amplitude-frequency-time information domain similar to that characterizing a normal data rate between the ear and brain. This additional 3200 bits per second is well within the capabilities of the visual subsystem channel capacity or its processing capability. Operating at a sub-conscious level, this dynamic smudge information will be "learned" by the wearer of special eyeglasses when used consistently may improve lip reading accuracy as well as mouth, tongue, and vocal chord control while speaking.

Any suitable algorithm for converting auditory inputs into diffuse visual patterns may be employed. One example of such an algorithm might be analogous to a spectrum analyzer, and might produce "smudges" resembling a display of a graphic equalizer. Another example of a suitable algorithm might produce smudges resembling an oscilloscope trace. Other algorithms may be contrived and implemented as well. As the subject wears the eyewear, the learning is experiential rather than tutorial; it is the result of common, everyday, repeated activity. A hearing person need not be formally taught the sound of a closing door, a telephone ring, a doorbell, a siren, or a multitude of other sounds. Experience is the informal teacher of them all. Likewise, a hearing-deficient subject wearing the specially-adapted eyewear is not formally taught the particular patterns of "smudges" corresponding to the closing door, telephone ring, doorbell, siren, and so forth. But repeated exposure to those sounds (the training stimuli) along with the corresponding smudges (the diffuse visual stimuli) eventually associates the diffuse visual patterns with the desired response (answer the phone, open the door, avoid the fire truck, and so on). Similarly, repeated lip-reading (the training stimulus) while wearing the special eyewear (providing the diffuse visual stimulus) eventually may lead to the desired response (accurate lip-reading, or awareness of a speaker when out of view). A hearing-deficient subject wearing the specially-adapted eyewear disclosed herein may in the experience of everyday activity subliminally or near-subliminally learn to associate the diffuse visual patterns with corresponding sounds, even if his or her own ears do not record the sounds.

For clarification, note that the 3200 bit per second visual input does not mean that the "smudges" in glasses that use this Invention are modulated at 3200 cycles per second. This rate would be many times faster than the visual fusion rate of the eye. The 3200 bit per second information rate is a result of 32 smudge areas on the glasses being modulated at only ten times per second (well below the fusion rate), with an amplitude resolution of ten levels possible for each area. Other overall rates may be employed, and an overall rate may be achieved through any suitable combination of numbers of smudge areas, modulation rate (below the visual fusion rate), and amplitude resolution while remaining within the scope of the present disclosure or appended claims.

Status or Tactical Indicators

Aircraft pilots of today are already presented, and soldiers of the future are likely to be presented, with image information in the traditional focused image display form, presented to the eye with some variation of a helmet-mounted display (HMD) or a heads-up display (HUD). The quantity of this information may be overwhelming to conscious processing, which is of limited bandwidth. Various efforts are already made to reduce the load on conscious processing, such as: automatic prioritization of targets, flashing of colored text and symbols for warning of urgent conditions, and highlighting of imagery to draw attention to computer-assessed areas of concern, along with other efforts to reduce the visual presentation burden placed upon a pilot or soldier using a helmet-mounted display.

Figure 7:
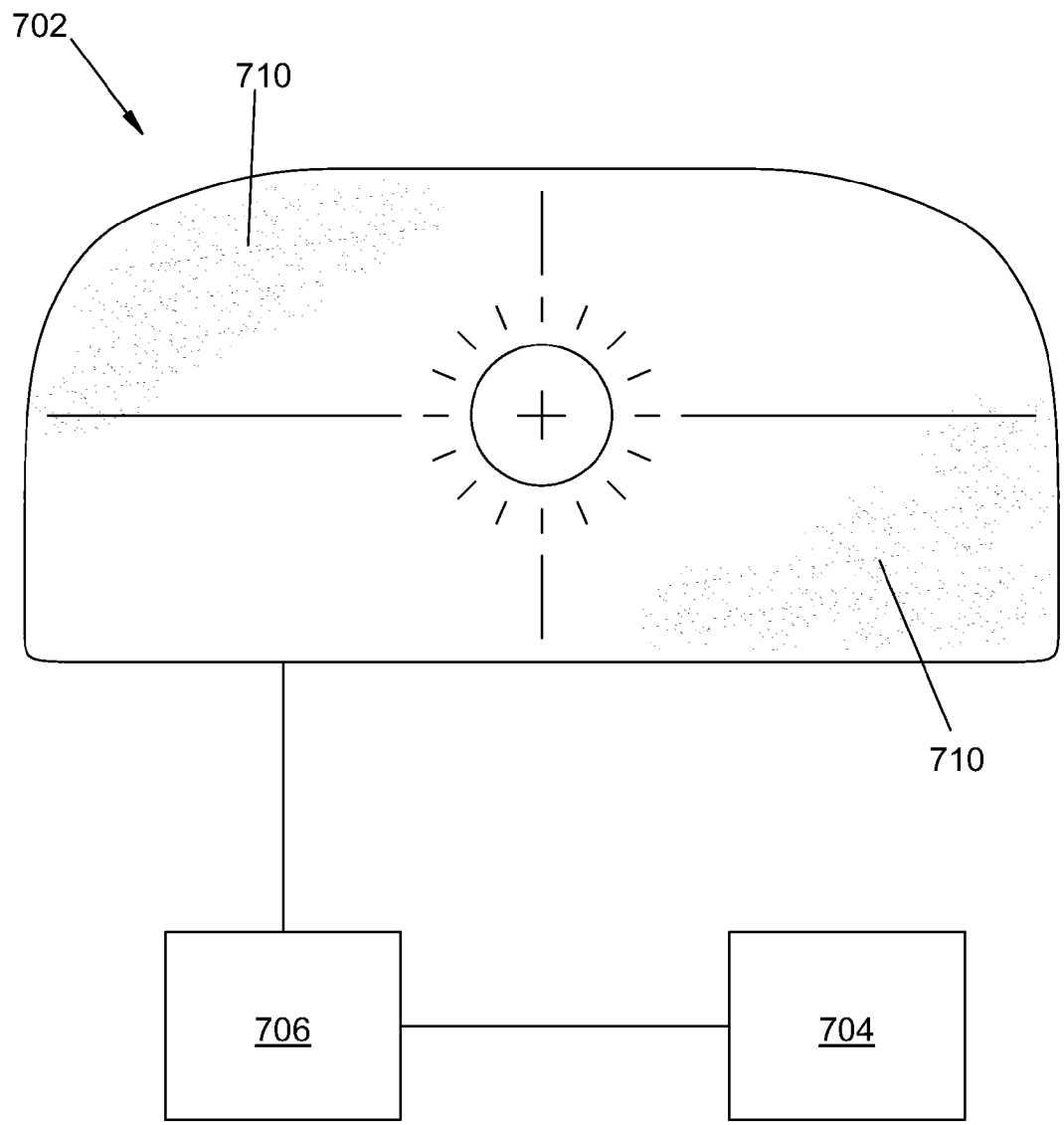
FIG. 7 illustrates schematically a sensor, processor, and display.

By implementations of methods of the present disclosure (schematically illustrated in FIG. 7), a significant amount of the information that might otherwise require conscious processing might be shifted to the high-bandwidth subconscious visual processing system. The HMD or HUD system may be adapted to create the needed "non-image" diffuse optical effects in any of a variety of suitable ways. These may include, but are not limited to: imparting a diffuse overlay onto the field of the primary display, or interposing a near-field optic with embedding liquid crystal or emitter technology between the pilot's eye and a standard HMD or HUD. In FIG. 7, the view through a display 702 (head-mounted or heads-up) is shown, with a diffuse visual pattern 710 overlaid thereon. The specific diffuse visual pattern is generated by electronic processor 706 based on signals received from status/tactical sensor 704. Other diffuse visual patterns may be produced as the signal from sensor varies, or based on signals from other sensors.

Examples of status or tactical data that might be suitable for subliminal or near-subliminal visual processing might include aircraft status parameters that require continuous monitoring (fuel, altitude, airspeed, stall speed, cabin pressure, and so on), but would interfere with "focused task" endeavors in critical circumstances if presented as focused text or a gauge. Subliminal training may be restricted to key, vital information, thereby reducing the propensity to ignore important cues to such information. This differs substantially from the case of giving alarm or key status information through the auditory system. The auditory system is so saturated with day-to-day experiential training that a human subject may ignore, or purposely turn off, such inputs when engaged in focused tasks such as pursuing targets (target fixation). For example, a pilot may be trained to associate a certain near-subliminal diffuse visual pattern with flipping the switch to access an auxiliary fuel tank. Upon reaching a threshold fuel level, the HMD or HUD may present the diffuse visual pattern, prompting the pilot to flip the auxiliary fuel switch at a subconscious level without interfering with target pursuit. As another example, another diffuse visual pattern might be associated with flipping a switch for an emergency oxygen supply. The subconscious access to the human brain established according to the methods disclosed or claimed herein may enable avoidance of aircraft accidents arising from the loss of oxygen at altitude, events that are such a danger because pilots become oblivious to standard warning signals when oxygen is lost.

Additional Embodiments

Room lights, other ambient lighting, display lights, and other lighting situations may also be slightly modified (at a subliminal or near-subliminal level) to produce conditioned response results according to the methods disclosed or claimed herein. Regardless of the manner in which the training is performed or the diffuse visual stimulus is presented, a suitably trained subject may later be induced to select one option rather than an alternative. For example, a subject might be looking at a display of competitive products. When one competitor's product is picked up, the background lighting could be slightly changed in accord with the subliminal training that was imparted using movies as the training vehicle, or some other display in which experiential coincidence can be repeated. A negative emotional sense could be invoked that induces the subject to put the first product down and pick up a competitor's product. The positive enforcement lighting subtlety could then be introduced, replacing the previous negative lighting subtlety, thereby confirming the subject buyer's feeling about purchasing the second product rather than the first.

Methods disclosed herein may be implemented utilizing other subject sensory regimes, including visual, tactile, taste, smell, and auditory. Visually-based exemplary embodiments are disclosed in detail herein. However, examples may be implemented for other sensory realms as well. For example, in one example of an auditory-based embodiment, existing music recordings are employed, most advantageously music recorded on CD, DVD, and other digital media. Blended into the music as it is played, using suitably modified playback hardware, would be subtle, diffuse subliminal (or near-subliminal) modifications that may not be identifiable as an element of the music. Such diffuse auditory stimuli may include, for example: slight impositions of noise; slight shifts in frequency of playback across the entire audio spectrum; slight shifts of frequency at selected portions of the audio spectrum; overlay of volume changes at low, sub-aural frequency (less than 20 Hz); other suitable modifications. Other suitable audio modifications may be contrived within the scope of the present disclosure. In another auditory-based exemplary embodiment, suitable diffuse subliminal or near-subliminal auditory blends or overlays are imparted onto the audio output of recorded speech or stories (such as found on "books on tape", for example). In either case (recorded music or recorded speech), the pattern of the diffuse auditory stimulus, as in the case of the visual embodiments of the invention, may be keyed to the emotional content of the recordings. The sequences for conditioning a subject, and then eliciting the conditioned response therefrom, would proceed in a manner similar to those described for the visually-based exemplary embodiments.

In practice, the diffuse stimuli (i.e., impositions and overlays) in any sensory realm need not necessarily be added to a sensory medium after its release by presentation hardware. Diffuse sensory stimuli may be insinuated into a sensory medium at the time of recording, during production, during post-production, or during replication for sale.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: i) it is explicitly stated otherwise, e.g., by use of "either . . . or", "only one of . . . ", or similar language; or ii) two or more of the listed alternatives are mutually exclusive within the particular context, in which case "or" would encompass only those combinations involving non-mutually-exclusive alternatives. It is intended that equivalents of the disclosed exemplary embodiments and methods shall fall within the scope of the present disclosure and/or appended claims. It is intended that the disclosed exemplary embodiments and methods, and equivalents thereof, may be modified while remaining within the scope of the present disclosure or appended claims.

What is claimed is:

1. A method, comprising:
repeatedly presenting to a subject a training stimulus, the training stimulus eliciting from the subject a desired response;
presenting to the subject a diffuse, non-imaged visual stimulus along with each presentation of the training stimulus; and
after repeatedly presenting the training stimulus, presenting the diffuse, non-imaged visual stimulus to the subject without the training stimulus so as to elicit from the subject the desired response,
wherein:
the diffuse, non-imaged visual stimulus is arranged so as to be perceived by the subject only at a subliminal or near-subliminal level; and
the diffuse, non-imaged visual stimulus is presented to the subject on at least a portion of a viewing screen, a visual display, or a heads-up display, or by eyewear or a head-mounted display.

2. The method of claim 1, wherein the training stimulus is configured or includes selected content so as to elicit a movement by the subject.

3. The method of claim 2, wherein:
the training stimulus comprises an image or scene; and
the diffuse visual stimulus comprises a brightness modulation of a selected portion of the image or scene.

4. The method of claim 1, wherein the training stimulus is configured or includes selected content so as to elicit a physiologic response of the subject.

5. The method of claim 4, wherein:
the training stimulus comprises an image or scene; and
the diffuse visual stimulus comprises a brightness modulation of a selected portion of the image or scene.

6. The method of claim 1, wherein the training stimulus is configured or includes selected content so as to elicit a psychological or emotional response of the subject.

7. The method of claim 6, wherein:
the training stimulus comprises an image or scene; and
the diffuse visual stimulus comprises a brightness modulation of a selected portion of the image or scene.

8. The method of claim 1, wherein:
the training stimulus comprises an image or scene; and
the diffuse visual stimulus comprises a brightness modulation of a selected portion of the image or scene.

9. A method, comprising presenting to a subject a diffuse, non-imaged visual stimulus in order to elicit a desired conditioned response, wherein:
- the desired conditioned response is a response elicited from the subject by a training stimulus;
- the subject is selected as having been previously exposed to repeated presentation of the training stimulus with concurrent presentation of the diffuse, non-imaged visual stimulus;
- the diffuse, non-imaged visual stimulus is arranged so as to be perceived by the subject only at a subliminal or near-subliminal level; and
- the diffuse visual stimulus is presented to the subject on at least a portion of a viewing screen, a visual display, or a heads-up display, or by eyewear or a head-mounted display.

10. The method of claim 9, wherein the training stimulus is configured or includes selected content so as to elicit a movement by the subject.

11. The method of claim 10, wherein:
- the training stimulus comprises an image or scene; and
- the diffuse visual stimulus comprises a brightness modulation of a selected portion of the image or scene.

12. The method of claim 9, wherein the training stimulus is configured or includes selected content so as to elicit a physiologic response of the subject.

13. The method of claim 12, wherein:
- the training stimulus comprises an image or scene; and
- the diffuse visual stimulus comprises a brightness modulation of a selected portion of the image or scene.

14. The method of claim 9, wherein the training stimulus is configured or includes selected content so as to elicit a psychological or emotional response of the subject.

15. The method of claim 14, wherein:
- the training stimulus comprises an image or scene; and
- the diffuse visual stimulus comprises a brightness modulation of a selected portion of the image or scene.

16. The method of claim 9, wherein:
- the training stimulus comprises an image or scene; and
- the diffuse visual stimulus comprises a brightness modulation of a selected portion of the image or scene.

* * * * *